United States Patent
Legeai et al.

(10) Patent No.: US 6,832,791 B2
(45) Date of Patent: Dec. 21, 2004

(54) CONNECTION MEANS FOR INTERCONNECTING TWO DUCT ELEMENTS

(75) Inventors: Patrick Legeai, Javene (FR); Olivier Guivar'ch, Le Rheu (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 10/441,113

(22) Filed: May 20, 2003

(65) Prior Publication Data

US 2003/0227171 A1 Dec. 11, 2003

(30) Foreign Application Priority Data

Jun. 7, 2002 (FR) .............................................. 02 07057

(51) Int. Cl.7 ................................................ F16L 19/06
(52) U.S. Cl. ..................... 285/373; 285/364; 285/421; 285/341; 285/343
(58) Field of Search ............................... 285/373, 364, 285/421, 341, 343

(56) References Cited

U.S. PATENT DOCUMENTS

| | | | | |
|---|---|---|---|---|
| 1,905,324 A | * | 4/1933 | Waters | 285/373 |
| 2,017,994 A | * | 10/1935 | Spang | 285/111 |
| 2,793,883 A | * | 5/1957 | Main, Jr. | 285/364 |
| 2,971,781 A | * | 2/1961 | Torres | 285/373 |
| 3,129,021 A | * | 4/1964 | Willis et al. | 285/367 |
| 4,119,335 A | * | 10/1978 | Rieffle et al. | 285/421 |
| 4,471,979 A | * | 9/1984 | Gibb et al. | 285/373 |
| 5,366,260 A | * | 11/1994 | Wartluft | 285/341 |
| 5,779,285 A | * | 7/1998 | Robison | 285/343 |

FOREIGN PATENT DOCUMENTS

| | | |
|---|---|---|
| CH | 405 838 | 1/1966 |
| CH | 677395 | 5/1991 |
| DE | 967 249 | 10/1957 |
| WO | WO 98/46926 | 10/1998 |
| WO | WO 01/81811 | 11/2001 |

* cited by examiner

Primary Examiner—David Bochna
(74) Attorney, Agent, or Firm—Young & Thompson

(57) ABSTRACT

Connection elements for interconnecting two duct ends, the elements comprising a tubular connection member for uniting the duct ends, the tubular member comprising at least one pair of half-bodies which is arranged so as to be closed on at least one duct end and which is associated with elements for gripping the duct end when the pair of half-bodies is closed on the duct end, the gripping elements comprising at least one outwardly-directed projection formed by plastic deformation of the duct end in a position set back from an end face of the duct end, and two inner shoulders of at least one of the half-bodies, which shoulders are spaced apart axially so as to receive therebetween the outwardly-directed projection.

7 Claims, 3 Drawing Sheets

CONNECTION MEANS FOR INTERCONNECTING TWO DUCT ELEMENTS

The present invention relates to connection means for interconnecting two duct elements.

By way of example, such connection means are designed to be used in circuits for fluid under pressure, for interconnecting two circuit elements, such as pipes, or a pipe and a functional member for transmitting or receiving fluid.

BACKGROUND OF THE INVENTION

Connection devices are known for interconnecting two pipes, said devices comprising a connection piece formed by a tubular body having two ends, each for receiving one end of a respective pipe which is designed to be inserted into the connection piece. The connection device also comprises two sleeves, each screwed onto a respective end of the tubular body so as to deform a claw washer, between an inner shoulder of the sleeve and the outside of the tubular body, the claw washer passing from a state in which the pipe can pass freely therethrough, to a state in which the pipe is held in place. The axial positioning of the pipes inside the tubular body is generally ensured by means of annular shoulders arranged in the tubular body so as to form abutments preventing the pipes from being driven further into the connection piece.

In another embodiment, the connection means comprise a sleeve divided into first and second portions in axial succession provided with means for providing leaktight and releasable connection between said portions and the end of the tubular body and the end of the pipe respectively, and a removable abutment ring provided with means for locking it axially on the pipe at a distance from the end of said pipe so as to constitute both an abutment shoulder preventing the pipe from being driven further into the tubular body and an axial abutment shoulder between the second portion of the sleeve and the pipe.

Connection means also exist comprising a tubular connection member for connecting duct ends, which member is constituted by a pair of half-bodies arranged so as to be closed on at least one duct end. The pair of half-bodies is associated with means for gripping said duct end when the pair of half-bodies is closed on said duct end. The gripping means comprise teeth for penetrating into the duct ends, and/or abutment shoulders for cooperating either with setbacks formed in the duct ends, or with elements fitted on the duct ends.

Documents DE-A-967 249, CH-A-405 838, CH-A-677 395, WO-A-01/81811, and WO-A-98/46926, in particular, disclose connection means of the above type, but having gripping means comprising at least an outwardly-directed projection formed by plastic deformation of the duct end in a position set back from an end face of said duct end, and two inner shoulders of at least one of the half-bodies that are spaced apart axially so as to receive the outwardly-directed projection between them. The outwardly-directed projection made by plastic deformation of the duct end can be made in particular on site as a result of its simplicity and of the small number of means to be implemented, in particular after the duct end has been cut to length. The connection is then made by laterally engaging the half-bodies on the duct end in such a manner that the inner shoulders of the pair of half-bodies bracket the outwardly-directed projection. In that type of device, it is relatively difficult to put effective sealing means into place and to hold them there.

OBJECT OF THE INVENTION

An object of the invention is to propose connection means of the above-mentioned type including effective and reliable sealing means.

BRIEF SUMMARY OF THE INVENTION

To this end, the invention provides connection means for interconnecting two duct ends, the means comprising a tubular connection member for uniting the duct ends, the tubular member comprising at least one pair of half-bodies which is arranged so as to be closed on at least one duct end, at least one of the half-bodies including two inner shoulders that are spaced apart axially so as to receive therebetween an outwardly-directed projection formed by plastic deformation of the duct end in a position set back from an end face of said duct end, the means further comprising a sealing sub-assembly including a bushing defining a housing for receiving a zone of the duct end, which zone is adjacent to the end face of said duct end, and an annular gasket projecting into an annular cavity of said housing, the annular cavity being defined laterally by an inner shoulder of the bushing and a face of a ring received to slide in the bushing and having an opposite face that forms a ramp projecting from the bushing so as to co-operate with an inside surface of corresponding shape of at least one of the half-bodies.

This facilitates handling of the sealing gasket, protects it during handling, and enables the sealing gasket to be held in place during assembly, thereby ensuring good positioning thereof relative to the duct end. As a result, the risks of leakage due to the gasket being badly assembled are limited. When the pair of half-bodies is closed on the duct end, the inside surface of the half-body pushes the ring which compresses the gasket against the inner shoulder of the bushing in such a manner that the gasket is deformed radially at least a little, which improves the contact between said gasket and the outside surface of the duct end.

The inner shoulder of the bushing is preferably tapered.

When the gasket is pressed against the shoulder by the ring, the above-mentioned shape of the shoulder tends to cause the sealing gasket to move radially inwards so as to press the gasket against the duct end.

According to a particular characteristic, the half-bodies overlap the two duct ends, and preferably each duct end includes an outwardly-directed projection, and the pair of half-bodies has two inner shoulders for co-operating with the outwardly-directed projection of each duct end.

The connection member is thus formed by the pair of half-bodies. As a result, the number of parts for the connection means is particularly small.

Other characteristics and advantages of the invention appear on reading the following description of particular non-limiting embodiments of the invention.

BRIEF DESCRIPTION OF THE DRAWINGS

Reference is made to the accompanying drawings, in which.

DETAILED DESCRIPTION OF THE INVENTION

Figure 1:
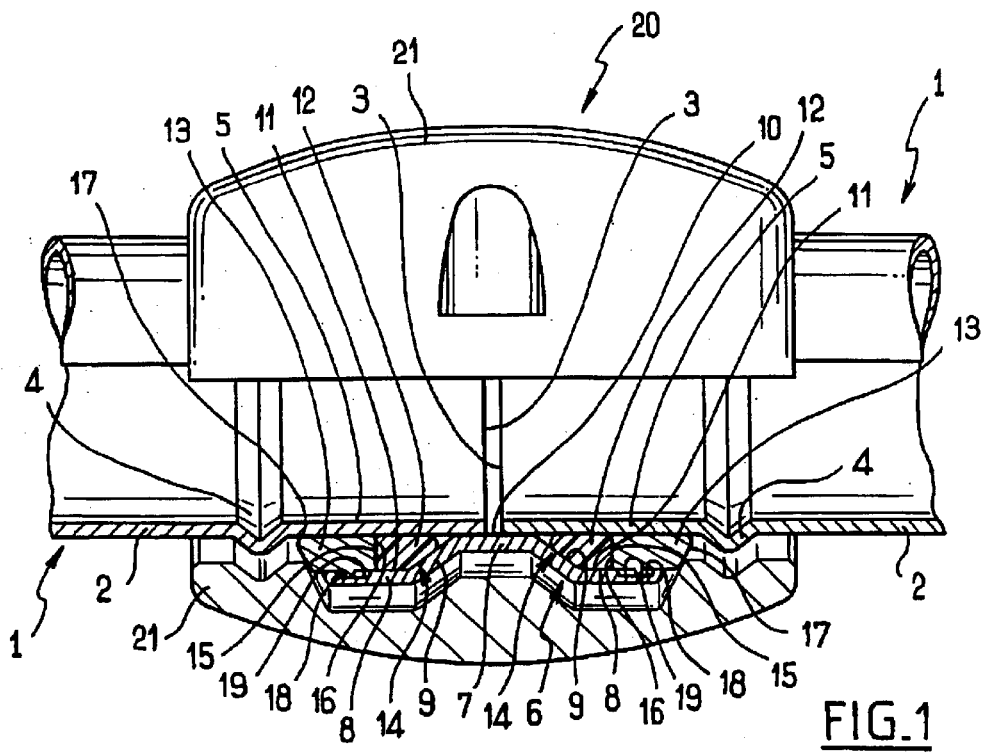
FIG. 1 is an elevation view in longitudinal half-section of the connection means of the invention, while it is being put into place on the duct ends.

With reference to the figures, the connection means of the invention are designed to enable end-to-end connection of two metal ducts generally referenced 1, each having an end 2 with an end face 3.

Each duct end 2 has an outwardly-directed projection 4 of annular shape which is separated from the end face 3 by a zone 5. The outwardly-directed projection 4 is made by plastic deformation, e.g. by means of a portable tool such as a pair of pliers, or by means of a special-purpose machine. The duct end 2 can also have an outwardly-directed projection in the form of a bulge, for example, or even of a plurality of bulges evenly distributed around the circumference of the duct end.

The connection means of the invention comprise firstly a sealing sub-assembly, and secondly a tubular connection member for interconnecting the ducts. (With regard to FIGS. 1 and 2, the detail references of the sealing sub-assembly and the detail references of the connection member are shown respectively in FIG. 1 and in FIG. 2 so as to simplify the drawings.) The sealing sub-assembly comprises a bushing generally referenced 6, having a central section 7 of inside diameter that is slightly greater than an outside diameter of the zone 5 of the duct end, and two end sections 8 which have an inside diameter that is greater than the inside diameter of the central section 7, and which are connected to the central section 7 by tapering walls 9.

The central section 7 thus defines a housing 10 for a portion of the zone 5 adjacent to the end face 3 of the duct ends 2, while the end sections 8 define cavities 11 for receiving an annular sealing gasket 12 and a ring 13.

The sealing gasket 12 has an inside diameter that is substantially equal to the outside diameter of the zone 5, and an outside diameter that is substantially equal to the inside diameter of the end section 8. The sealing gasket 12 has a tapering side face 14 for co-operating with the inside surface of the tapering wall 9, and, on its opposite side, a substantially radial side face 15 for co-operating with the ring 13.

The ring 13 has an inside diameter that is substantially equal to the outside diameter of the zone 5, and an outside diameter that is substantially equal to the inside diameter of the end section 8. The ring 13 has a substantially radial side face 16 for co-operating with the side face 15 of the sealing gasket 12, and, on its opposite side, a tapering convex side face 17 which projects out from the bushing 6. The ring 13 has an annular outer step 18 received in a groove 19 which is formed in the cavity 11. The ring 13 is slidably received in the cavity 11 to slide between two positions which are described in detail below and which are defined by the flanges of the groove 19 with which the outer step 18 comes into abutment. The outer step 18 is arranged in such a manner as to enable the ring 13 to be snap-fastened in the bushing 6.

The connection member opens and is, in this case, constituted by a pair, generally referenced 20, of half-bodies 21 each of which has one side 22 provided with a connection hinge 23 for connecting to the corresponding side 22 of the other half-body 21, and an opposite side 24 provided with fastener means for fastening it to the corresponding side 24 of the other half-body 21. In this case, the fastening means comprise a screw 25 mounted on the side 24 of one of the half-bodies 21 so as to turn about an axis that is transverse to the pair 20 of half-bodies 21, and a corresponding tapping 26, formed in the side 24 of the other half-body 21, for receiving the screw 25.

Each half-body 21 includes a central cavity 27 for receiving the sealing sub-assembly, and includes, on either side of the central cavity 27, two end cavities 28 for receiving a portion of a duct end 2.

The central cavity 27 is provided with an inwardly-projecting collar 29 designed to be received in a groove 30 of the bushing 6.

Each end cavity 28 comprises a groove 31 defined by two flanges forming shoulders 32 and designed to receive the outwardly-directed projection 4. Each end cavity 28 is connected to the central cavity 27 by a tapering concave surface 33.

Figure 3:
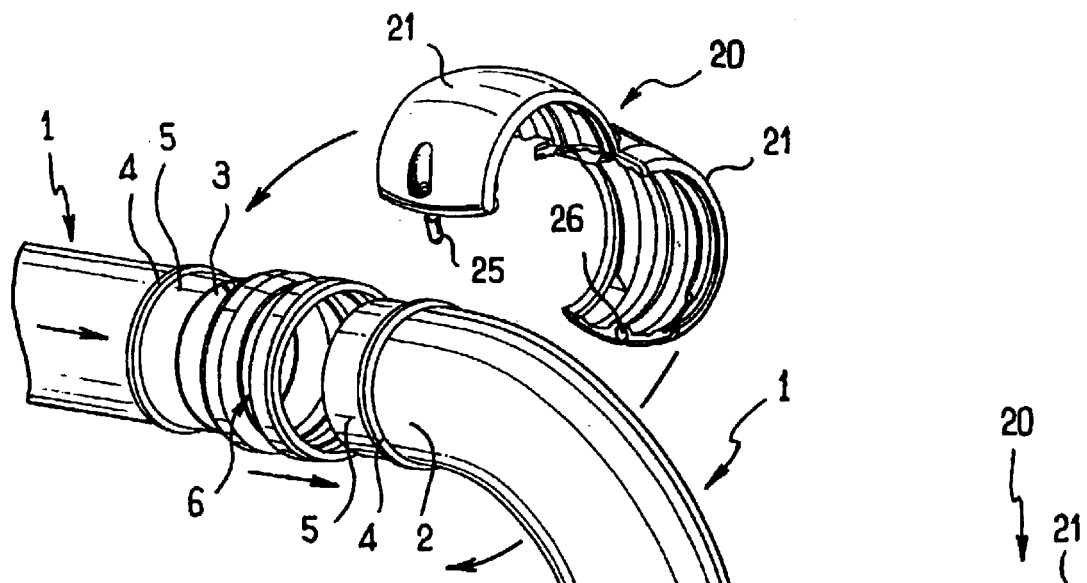
FIG. 3 is an exploded, perspective view of the connection means while they are being put into place on the ducts.
Figure 4:
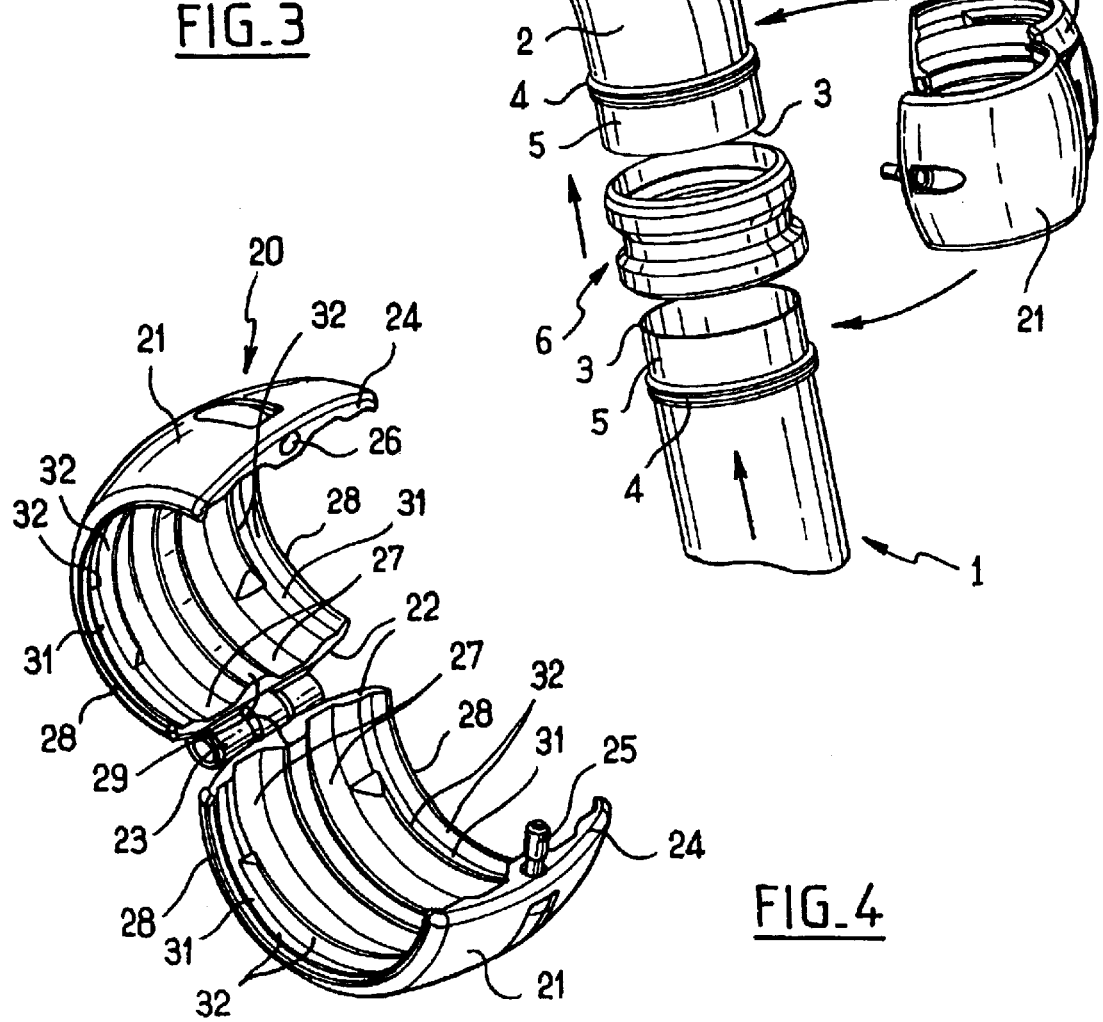
FIG. 4 is a perspective view of a pair of half-bodies.
Figure 5:
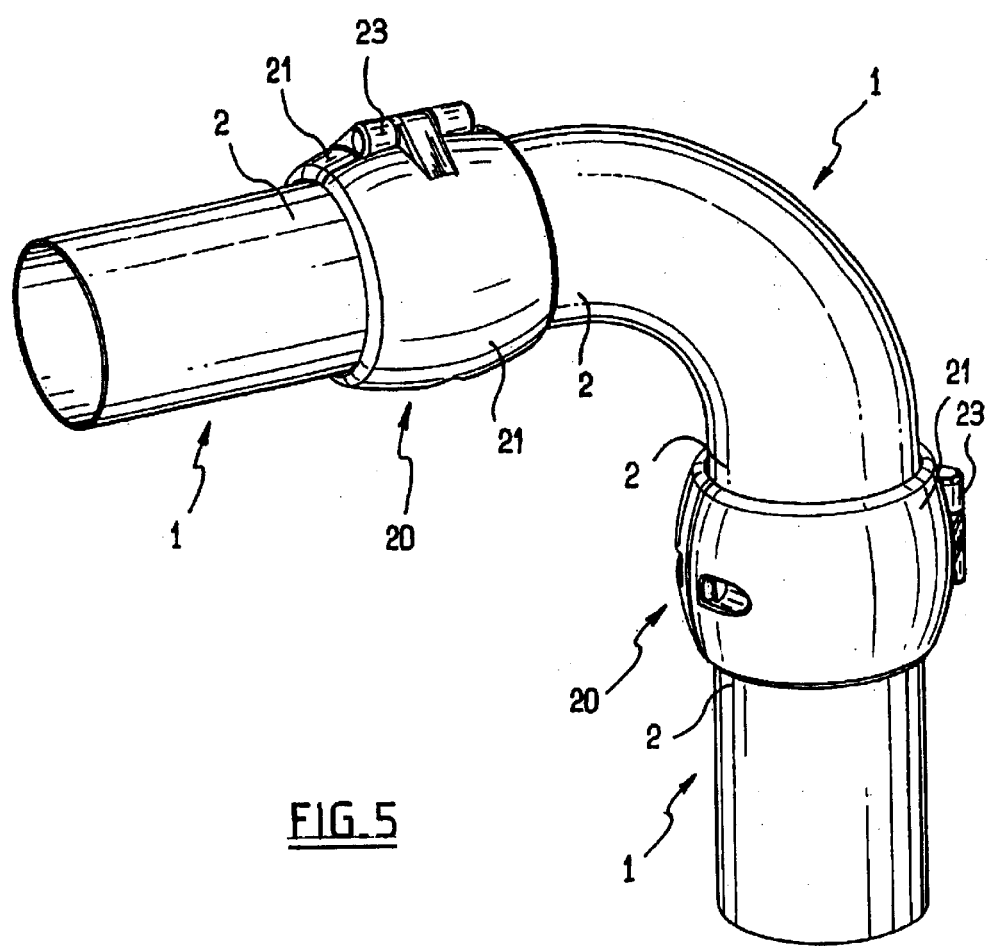
FIG. 5 is a view similar to that of FIG. 3 showing ducts connected by connection means of the invention.

Connection is achieved by sliding the ends 2 of the ducts 1 into the bushing 6 until the portion of the zone 5 adjacent to the end face 3 of each end 2 is received in the central section 7 of the bushing 6 (FIG. 3).

The open pair 20 of half-bodies 21 is then engaged laterally on the bushing 6 and on the ends 2 of the ducts 1 in such a manner that the outwardly-directed projections 4 are situated facing the grooves 31 of the half-bodies, and that the collar 29 is situated facing the groove 30 of the bushing 6 (FIG. 1).

The pair 20 of half-bodies 21 is then closed on the ends 2 and the bushing 6, and the screw 25 is screwed into the tapping 26.

While the half-bodies are being closed, the projecting collar 29 is brought into the groove 30 of the bushing 6 so as to prevent the busing 6 from moving in translation relative to the pair 20 of half-bodies 21.

Figure 2:
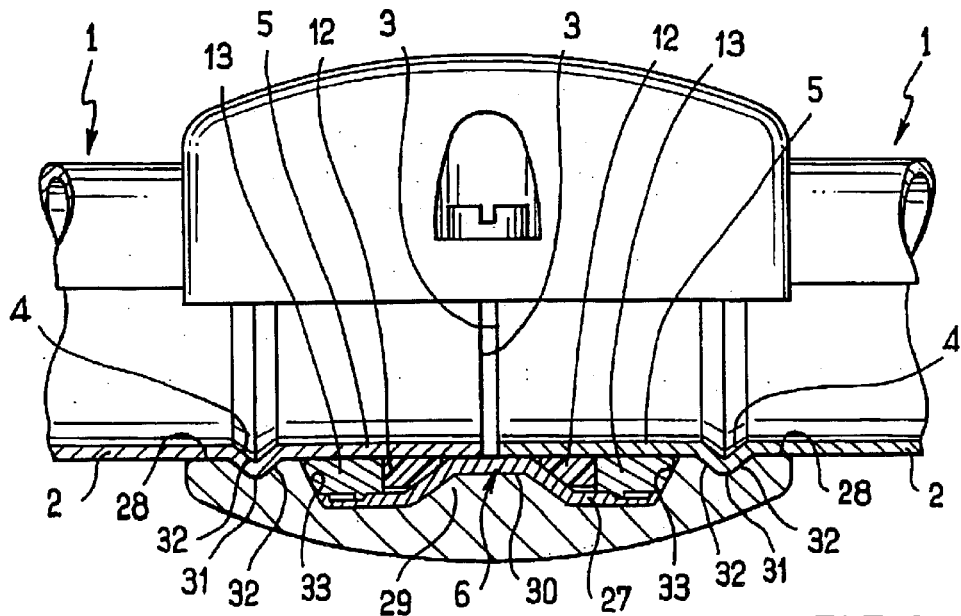
FIG. 2 is a view similar to that of FIG. 1 showing the connection means, once the duct ends have been interconnected.

The tapering surfaces 33 act as cams on the side faces 17 of the rings 13 while they are in their positions set back from the tapering walls 6 (FIG. 1), thereby bringing the rings 13 into their positions closer to the tapering walls 9 (FIG. 2). The rings 13 then push the sealing gaskets 12 towards the tapering walls 9 in such a manner that firstly the sealing gaskets 12 are compressed and deform radially, and secondly the side faces 14 act as cams on the tapering walls 9 so as to displace the sealing gaskets 12 radially inwards, thereby pressing the sealing gaskets 12 firmly against the zones 5 of the ends 2 of the ducts 1.

The outwardly-directed projections 4 are received in the grooves 31 and come into abutment with the shoulders 32 which prevent any axial displacement of the duct ends relative to the pair 20 of half-bodies 21.

Disconnection is performed by carrying out the same operations in reverse order.

Naturally the invention is not limited to the embodiment described, and variant embodiments can be applied thereto without leaving the ambit of the invention as defined by the claims.

In particular, the connection means can comprise two pairs of half-bodies each co-operating with the outwardly-directed projection on one of the duct ends, and a connection member for interconnecting the two pairs of half-bodies, e.g. a ring having a threaded section and a ring having a tapped section designed to be mounted on the pairs of half-bodies closed on the duct ends.

The pairs of half-bodies can also be in two parts connected by a resilient ring so as to be radially expandable in such a manner as to pass over the outwardly-directed projections. The half-bodies can also be bolted together without having to provide a hinge.

The half-bodies can be fastened together using other fastener means, e.g. a plurality of screws, a pin, . . . .

The shoulders of the half-bodies designed to co-operate with the outwardly-directed projections can be continuous or interrupted. Only one of the half-bodies need be provided with shoulders for co-operating with the outwardly-directed projections.

What is claimed is:

1. Connection means for interconnecting two duct ends, the means comprising a tubular connection member for uniting the duct ends, the tubular member comprising at least one pair of half-bodies which is arranged so as to be closed on at least one duct end, at least one of the half-bodies including two inner shoulders that are spaced apart axially so as to receive therebetween an outwardly-directed projection formed by plastic deformation of the duct end in a position set back from an end face of said duct end, the connection means comprising a sealing sub-assembly including a bushing defining a housing for receiving a zone of the duct end, which zone is adjacent to the end face of said duct end, and an annular gasket projecting into an annular cavity of said housing, and wherein the annular cavity is defined laterally by an inner shoulder of the bushing and a face of a ring received to slide in the bushing and having an opposite face that forms a ramp projecting from the bushing so as to co-operate with an inside surface of corresponding shape of at least one of the half-bodies.

2. Connection means according to claim 1, wherein the inner shoulder of the bushing is tapered.

3. Connection means according to claim 1, wherein the half-bodies overlap the two duct ends.

4. Connection means according to claim 3, wherein each duct end includes an outwardly-directed projection, and the pair of half-bodies has two inner shoulders for co-operating with the outwardly-directed projection of each duct end.

5. Connection means according to claim 1, wherein the outwardly-directed projection is of annular shape.

6. Connection means according to claim 1, wherein each half-body has one side provided with a connection hinge for connecting to the corresponding side of the other half-body, and an opposite side provided with fastener means for fastening it to the corresponding side of the other half-body.

7. Connection means according to claim 6, wherein the fastener means comprise at least one screw mounted on the side of the half-body under consideration so as to turn about an axis that is transverse to the pair of half-bodies, and at least one corresponding tapping formed in the other half-body.

* * * * *